No. 617,827. Patented Jan. 17, 1899.
W. A. CONNELL.
STOCK WATERER.
(Application filed July 11, 1898.)
(No Model.)
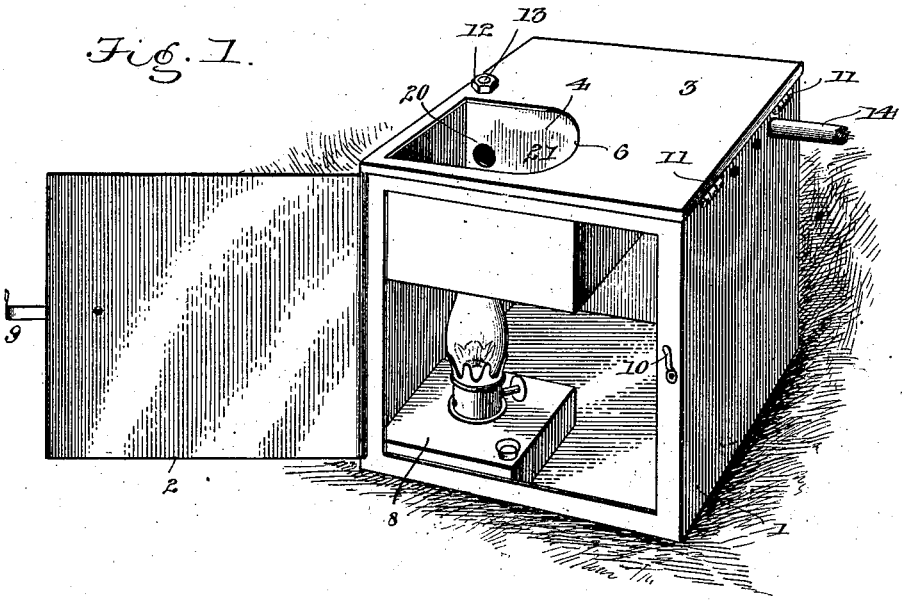
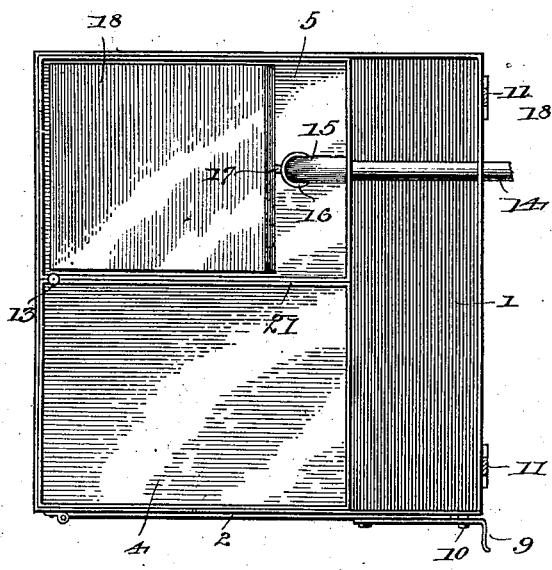
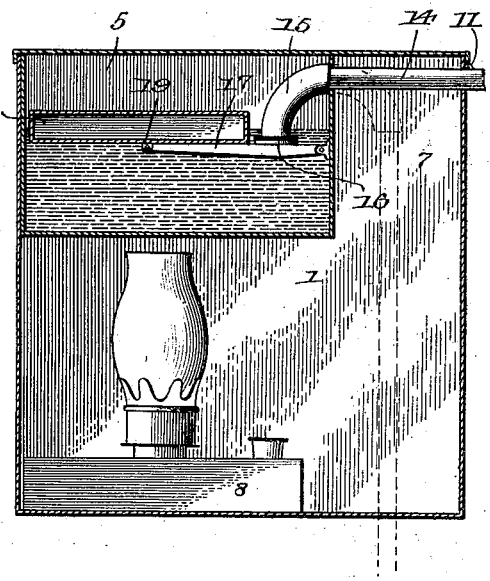
Witnesses
William A. Connell, Inventor
By his Attorneys,

UNITED STATES PATENT OFFICE.

WILLIAM A. CONNELL, OF ATKINSON, ILLINOIS.

STOCK-WATERER.

SPECIFICATION forming part of Letters Patent No. 617,827, dated January 17, 1899.

Application filed July 11, 1898. Serial No. 685,621. (No model.)

*To all whom it may concern:*

Be it known that I, WILLIAM A. CONNELL, a citizen of the United States, residing at Atkinson, in the county of Henry and State of Illinois, have invented a new and useful Stock-Waterer, of which the following is a specification.

The invention relates to improvements in stock-waterers.

The object of the present invention is to improve the construction of stock-waterers and to provide a simple and comparatively inexpensive one capable of automatically controling the supply of water to the drinking-trough and adapted to prevent the water from freezing in cold weather.

The invention consists in the construction and novel combination and arrangement of parts hereinafter fully described, illustrated in the accompanying drawings, and pointed out in the claims hereto appended.

In the drawings, Figure 1 is a perspective view of a stock-waterer constructed in accordance with this invention. Fig. 2 is a plan view, the hinged top being removed. Fig. 3 is a vertical sectional view.

Like numerals of reference designate corresponding parts in all the figures of the drawings.

1 designates a casing rectangular in cross-section, constructed of suitable material, and provided at one end with a hinged door 2, which affords access to the interior of the casing. The casing, which is provided with a hinged top or cover 3, has a watering-trough 4 and a float-compartment 5 at its upper portion, the hinged top or lid being provided over the drinking-trough with an opening 6 to enable stock to obtain the water. The drinking-trough 4 and the float-compartment 5, which are preferably of equal area, terminate short of the back of the casing, as clearly illustrated in the drawings, to provide a space 7 to facilitate the removal of the heating device 8 from the casing and to enable it to be readily placed therein. The heating device 8 preferably consists of a lamp, and it is located beneath the water-trough, which is constructed of sheet metal or similar material, and the said heating device enables the water in the trough to be maintained at a sufficient temperature to prevent freezing. The lamp need be used only in intensely cold weather, when the water in the drinking-trough is liable to freeze.

The door 2 at the end of the casing is provided with a suitable latch 9, which engages a keeper 10 of the casing, and the top or lid 3, which is hinged at the back of the casing at 11, is secured at the front by means of a nut 12 and a threaded stem 13, mounted on the adjacent wall of the drinking-trough and the float-compartment and extending through a perforation of the top 3.

Water is admitted to the float-compartment through a supply-pipe 14, extending horizontally through the rear wall of the casing and the rear wall of the float-compartment and having a depending inner end 15. The supply of water is automatically cut off by means of a valve 16, carried by a lever 17, which is operated by means of a float 18. One end of the lever is fulcrumed on the rear wall of the float-compartment and its other end is hinged to the lower face of the float at 19. The float-compartment 5 and the drinking-trough 4 communicate through perforations 20 in the division-wall 21, and when the water rises in the float-compartment it carries the float with it and automatically shuts off the supply by closing the valve when the water rises to the desired height. Instead of extending the supply-pipe through the back of the casing it may, as illustrated in dotted lines in Fig. 3 of the accompanying drawings, pass upward through the bottom of the casing. This latter construction is preferable when water is carried a considerable distance from the source of supply and it is desired to locate the supply-pipe below the surface of the ground to prevent freezing.

The invention has the following advantages: The stock-waterer, which is simple and comparatively inexpensive in construction, is adapted to prevent water from freezing in extremely cold weather, and it affords ready access to the heating apparatus. Convenient access is afforded to the water-trough and the supply of water is automatically controlled to prevent waste of water and insure a constant supply.

Changes in the form, proportion, and minor details of construction may be resorted to without departing from the spirit or sacrificing any of the advantages of this invention.

What I claim is—

1. A stock-waterer comprising a casing provided at one side with a door and having a top or cover with an opening at its front, a drinking-trough arranged within the casing beneath the opening of the top or cover and terminating short of the back of the casing to provide a space to facilitate the introduction and removal of the heating device, and means for controlling the supply of water, substantially as described.

2. A stock-waterer comprising a casing, the top 3 hinged to the casing at the back thereof and provided at the front of the casing with an opening, a drinking-trough arranged within the casing beneath the opening of the top, a float-compartment mounted adjacent to the drinking-trough, said drinking-trough and float-compartment terminating short of the back of the casing to provide a space for facilitating the introduction and removal of the heating device, and a supply-pipe, substantially as described.

In testimony that I claim the foregoing as my own I have hereto affixed my signature in the presence of two witnesses.

WILLIAM A. CONNELL.

Witnesses:
GEO. B. HOFF,
CHAS. WERKHEISER.